United States Patent
Miao

(10) Patent No.: US 7,403,497 B2
(45) Date of Patent: Jul. 22, 2008

(54) DATA TRANSPORT BETWEEN A MEDIA GATEWAY AND SERVER

(75) Inventor: Kai Miao, Boonton, NJ (US)

(73) Assignee: Intel Corporation, Santa Clara, CA (US)

( * ) Notice: Subject to any disclaimer, the term of this patent is extended or adjusted under 35 U.S.C. 154(b) by 524 days.

(21) Appl. No.: 10/987,450

(22) Filed: Nov. 12, 2004

(65) Prior Publication Data
US 2006/0104290 A1 May 18, 2006

(51) Int. Cl.
*H04B 7/212* (2006.01)
(52) U.S. Cl. .................. 370/321; 370/314; 370/336; 370/337; 370/338; 455/15; 455/466; 455/509; 455/511; 709/227; 709/230; 709/238
(58) Field of Classification Search ............ 370/321, 370/352–357, 261, 264, 392, 314, 336, 337, 370/338; 455/450–453, 466, 15, 509, 511; 379/265.11, 88.17; 709/227, 230, 238
See application file for complete search history.

(56) References Cited

U.S. PATENT DOCUMENTS

| | | | |
|---|---|---|---|
| 6,434,140 B1 * | 8/2002 | Barany et al. | 370/352 |
| 6,434,606 B1 * | 8/2002 | Borella et al. | 709/214 |
| 6,504,838 B1 * | 1/2003 | Kwan | 370/352 |
| 6,614,902 B1 * | 9/2003 | Rizzetto | 379/265.11 |
| 6,847,618 B2 * | 1/2005 | Laursen et al. | 370/261 |
| 6,981,263 B1 * | 12/2005 | Zhang et al. | 719/310 |
| 7,149,287 B1 * | 12/2006 | Burger et al. | 379/88.17 |
| 7,161,932 B1 * | 1/2007 | Watts | 370/352 |

OTHER PUBLICATIONS

Tanigawa, K., et al., "Simple RTP Multiplexing Transfer Methods for VoIP", Internet Engineering Task Force Internet Draft, 10 pages, Nov. 1998.*
Rosenberg, J., et al., "An RTP Payload Format for Multiplexing", *Internet Engineering Task Force Internet Draft*, pp. 1-10, May 1998.
Subbiah, B., et al., "User Multiplexing in RTP Payload Between IP Telephony Gateways", *Internet Engineering Task Force Internet Draft*, pp. 1-17, Aug. 1998.

* cited by examiner

*Primary Examiner*—Stephen M D'Agosta
(74) *Attorney, Agent, or Firm*—Fish & Richardson P.C.

(57) ABSTRACT

A system and method for reducing latency includes receiving at a gateway time division multiplexed data from multiple sender devices, the time division multiplexed data including payloads. The method also includes a generated packet that includes the payloads from the received time division multiplexed data from the multiple sender devices. The method also includes indicating in the generated packet a destination indication associated with at least some of the payloads of the received time division multiplexed data and forwarding the generated packet to a media server.

23 Claims, 3 Drawing Sheets

US 7,403,497 B2

DATA TRANSPORT BETWEEN A MEDIA GATEWAY AND SERVER

BACKGROUND

Media services play an important part in telecommunication systems such as call centers, traditional public switched telephone network (PSTN) switches, and conferencing servers. The convergence of IP technology with telecommunication networks uses media services provided from the Internet to users either in the IP network or in another network. Many types of media services can be deployed.

Media services provided across multiple types of networks, e.g., calls traveling from the Internet to another network can experience unacceptable delay. A portion of the delay is due to the use of a gateway (e.g., a media gateway) and media server that connect the networks. A media gateway, e.g., circuit switch, IP gateway, or channel bank that converts data from a format required for one network to the format required for another network.

DESCRIPTION

Figure 1:
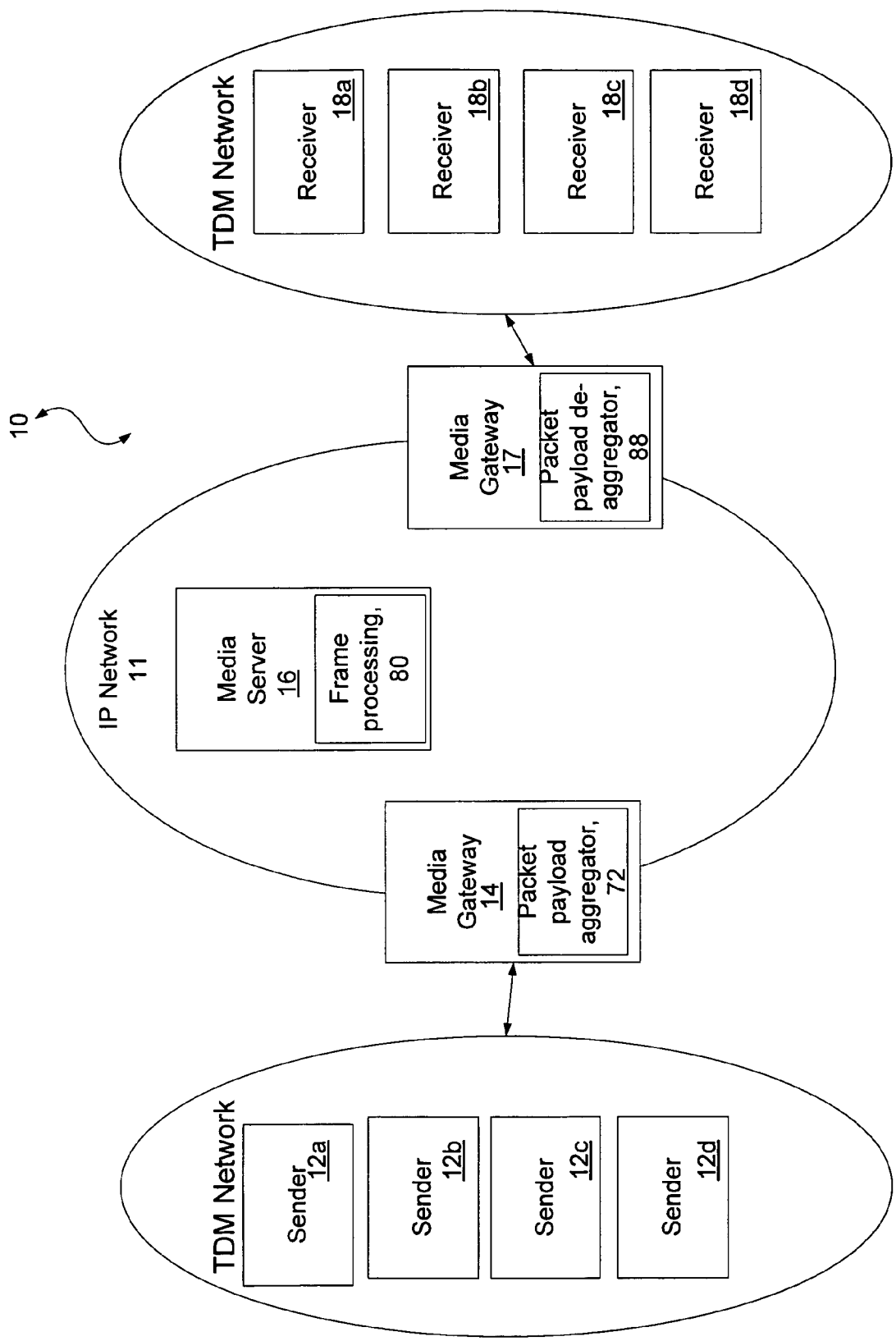
FIG. 1 is a block diagram of a system including a time division multiplexed (TDM) network and in Internet protocol (IP) based network.

Referring to FIG. 1, a media services architecture including time division multiplexed networks 13 and 15 in communication with an internet protocol (IP) network 11. Media gateways 14 and 17 provide an interface between the TDM networks 13 and 15 and IP network 11. In general, a media gateway formats a packet, frame, or other data from a format required by a protocol on one network to a format required by another protocol on a different network. IP network 11 also includes on or more media servers 16. The media gateways 14 and 17 and media server 16 run processes that respectively aggregate packet payloads 72 and de-aggregate packet payloads 88 and process frames 80 as will be further described below. In addition, a media server can perform voice or media compression or other data manipulation. An IP network 11 can be used to transmit media such as voice, video, collaboration data, and the like between multiple parties where the multiple parties need to see or hear media in a real-time or semi-real time manner. Media gateways 14 and 17 provide an interface between the TDM based networks 13 and 15 and the IP based network 11.

One or more time division multiplexed (TDM) based networks route data to the media gateway 14 or 17 and the media gateway 14 or 17 transmits the data over the IP network 11. For example, if the sender and receiver are both on the TDM based networks 13 and 15, the data can be transmitted to the media server 16 over the IP network 11. In other examples, the receiver or the sender may be located within the IP network 11 and the second party located on a TDM network. When a sender and receiver are on networks running different protocols, the packet may be routed from the media gateway 14 to the receiver without passing through the media server 16. While such architecture 10 using media gateways, can simplify the routing and collection of data from the TDM based network 13 or 15 and simplify the data conversion to a format recognized by the IP based network 11, the architecture 10 can also increase the delay incurred when transmitting a packet from a sender 12 to a receiver. For example, when a sender and receiver are both located outside the IP network 11, the packet or data will incur delay associated with the transmission of the packet from the media gateway 14 or 17 to the media server 16 to the media gateway 14 or 17.

A conferencing application can require low latency. Long delays can be experienced by callers that use a gateway to connect from a Public Switched Telephone Network (PSTN) network to an Internet Protocol (IP) network, to use, e.g., conferencing services located on the IP network 11. This delay can be due to the compression of speech signals by the gateway 14 for transmission over the IP network. Further delay is introduced as compressed speech frames arrive at the conferencing center (e.g., the media server 16) because the frames are decompressed and buffered for the removal of network jitter. Additionally, a mixed packet stream may need to be delivered back to the media gateway 14, therefore, introducing a second jitter buffer inside the gateway 14. Other delays include those associated with speech decoding, speech look-ahead buffering, network delay, and transmission delay.

The delay for a roundtrip data transmission can be substantial. For example, the delay can be large when more multiple parties call from TDM networks (e.g., PSTN networks) and share media content. For example, when a first party located in network 13 desired to communicate with a second party in network 15. In this example, assuming there is little network jitter and negligible transmission delay, the parties calling from a PSTN or TDM network in a conference would experience approximately 170 ms roundtrip delay when talking to each other using the Internet engineering task force (IETF) recommended a packet size corresponding to, e.g., 20 ms of data for the high compression speech codec ITU-T G.729. The delay includes the delay associated with encode buffering and look ahead buffering, server jitter buffer delay, mixing operation delay, plus gateway buffering. Typical delay times for these delays can be approximately 25 ms+20 ms+20 ms+20 ms in each direction resulting in a total roundtrip time of estimate of 170 ms. Additional propagation delay could add approximately 50 ms in each direction (assuming a relatively long transmission) resulting in a total roundtrip delay of 270 ms. This level of delay may not be acceptable for some media applications.

FIG. 1 shows a gateway-server-gateway connection (for example, as used in conferencing multiple PSTN customers) however, other connections are possible. For example, a single gateway-server connection could be used to conference a PSTN customer with another user on the IP network Referring to FIG. 2, a packet aggregation or data transport technique for reducing delay of data transmitted on architecture 10 is shown. The data transport technique transmits packets at decreased packet intervals without introducing substantial packet overhead to reduce the overall latency in the conference call.

In architecture 10, data (e.g., time division multiplexed (TDM) based data) from multiple callers or senders received by the media gateway 14 or 17 is forwarded to the media server 16. The payloads for multiple packets, from multiple data streams, or from multiple senders can be combined into a larger packet (superframe) and sent from the media gateway 14 to the media server 16. By taking advantage of the common destination of the data, the overhead for the packets sent to the media server can be reduced.

Figure 2:
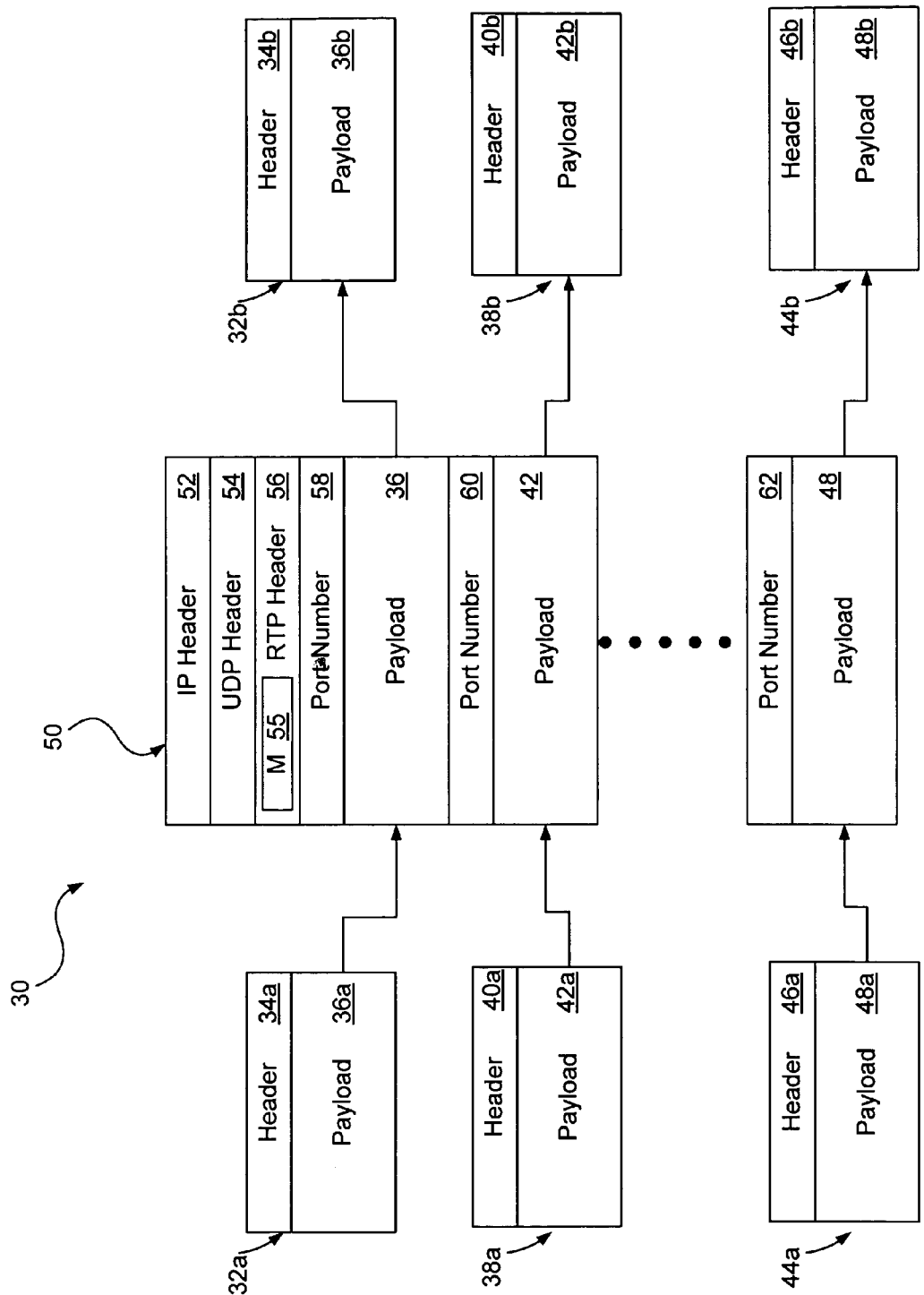
FIG. 2 is a block diagram of a frame or packet.

As shown in FIG. 2, multiple data streams 32a, 38a, and 44a include a header 34a, 40a, and 46a respectively and a payload 36a, 42a, and 48a respectively. The multiple data streams are received by the gateway 14 or 17 and the gateway 14 or 17 generates a generated packet 50, e.g., packet 50 for transmission to the IP network 11. For example, the gateway performs TDM-IP packet conversion to generate packets in a format used on the IP network 11 based on the data included in a TDM based signal or data stream. The payload of the generated packet 50 includes multiple payloads (e.g., payloads 36a, 42a, and 48a) from the TDM-based data stream received by the gateway 14 or 17. Since the final destination or an intermediate destination of the payloads 36, 42, and 48 may differ, a destination indication, e.g. a port number, is associated with each payload in packet 50. For example, the header 34a of packet 32a indicates the destination of packet 32a. In the generated packet 50, the destination is indicated by the destination indication, e.g. a port number 58 that is associated with the payload 36a. The destination indication, e.g. a port number 58 can be associated with a particular receiver or data channel.

For example, a packet can be sent from TDM network 13 to TDM network 15 via IP network 11. In this example, gateway 14 sends packet 50 to the media server 16 (FIG. 1). Subsequent to the media server processing the packet 50, the media server sends the packet to gateway 17 (FIG. 1). Gateway 17 interfaces between IP network 11 and TDM based network 15 and generates multiple TDM based data streams 32b, 38b, and 44b from packet 50. The multiple data streams 32b, 38b, and 44b include multiple payloads 36b, 42b, and 48b. The gateway 17 also adds a header 34b, 40b, and 46b to each of the data streams 32b, 38b, and 44b based on the port associated with the payload in packet 50.

The packets 50 are generated according to a predefined, common format. The media gateway 14 generates the packet 50 including multiple payloads, the media server 16 processes the packet, and the media gateway 17 sends the payloads to the appropriate destinations. In each packet (e.g., packets received from the media gateway 14 and packets 50 generated for forwarding to the media server 16), all payloads are of the same type. For example, the payloads can be defined by a standard such as RFC1889, to allow a receiver and a transmitter to have the common knowledge of the structure and content of the packets. The type can be indicated in the Real Time Protocol (as described in Internet Engineering Task Force (IETF) Request for Comments (RFC) 1889) header 56 of packet 50.

In each packet or data stream (e.g., data received by the media gateway 14 and packets 50 generated for forwarding to the media server 16), all of the payloads have the same size or length. The length is common such that the media server 16 can identify the individual payloads and destination indications. The size of the payload can vary according to the particular Internet Engineering Task Force (IETF) standard used by the network for media transmissions. For example, the ITU-T G.711 standard includes packets with a payload length of 1 ms, the G.729 standard includes a payload length of 10 ms, the G.723.1 standard includes a payload length of 30 ms, and the like. The payload size can be the minimum frame size of the payload type for the implemented standard. In embodiments where the payload size is the minimum frame size of the payload type for the implemented standard, the payload type indicated in the RTP header 56 can also indicate the payload length.

Packet 50 also includes a User Datagram Protocol (UDP) header 54 that includes an indication of the length of packet 50. The number of payloads included in packet 50 is established based on the length of the packet (as indicated in header 54) and the payload type (as indicated in RTP header 56). The destination indication, e.g. port number in packet 50 is of a predefined length and can be independent of the payload type. For example, the port can be represented by two bytes.

Media that is transmitted can include voice frames and silence indication frames (SID frames). Either packet 50 includes either payloads for multiple voice frames or multiple SID frames. A packet 50 including payloads for multiple voice frames can be referred to as a voice superframe while a packet 50 including multiple SID frames can be referred to as an SID superframe. A bit in the RTP header (e.g., marker bit 55) indicates whether a packet 50 is a voice superframe or an SID superframe. For example, for a packet 50 including voice frames, marker bit 55 is set to 0 while for a packet 50 including SID frames marker bit 55 is set to 1 (or vice versa). The payload type indicated in the RTP header 56 and the packet length indicated in the UDP header 54 determine the number of SID frames in an SID superframe or voice frames in a voice superframe.

In some embodiments, the size of packet 50 is limited by the protocol of the associated IP network 11. For example, Ethernet specifies a maximum packet size of 1500 bytes. Thus, the transmitter and receiver conform to this maximum size such that the size of the payload of the superframe (e.g., the total size of the payloads from multiple packets, the associated port indications, and packet header information) does not exceed the specified length for the network.

In addition to voice data and silence indication data, tone data (e.g., tone data is described in RFC 2833) can also be transmitted between a TDM based network and an IP based network via a media gateway and server. In general, tone data is small in size and infrequent in transmission in comparison to the voice data. The tone data is not included in the superframes generated by the media gateway. Instead, the tone data is transported separately between the sender and receiver as individual transmissions. For example, the tone data may not be included in the superframes due to the difference in size compared to voice frames. In addition, the tone data may not be included in the superframes due to the infrequent transmission of tone data. Since tone data is generally transmitted infrequently, handling the tone packets separately is sufficient. In addition, tone information (control information) has less latency requirements in comparison to voice frames.

As described above, the generation and transmission of superframes between the media gateway and the media server can reduce data transport latency without introducing significant overhead. In addition, in some embodiments, the use of the superframe can improve the overall voice or media quality due to the shorter sampling durations. The superframe can also simplify or reduce the computation requirements at the media server because a single header is processed and all payloads for the superframe are of the same type and length.

Figure 3:
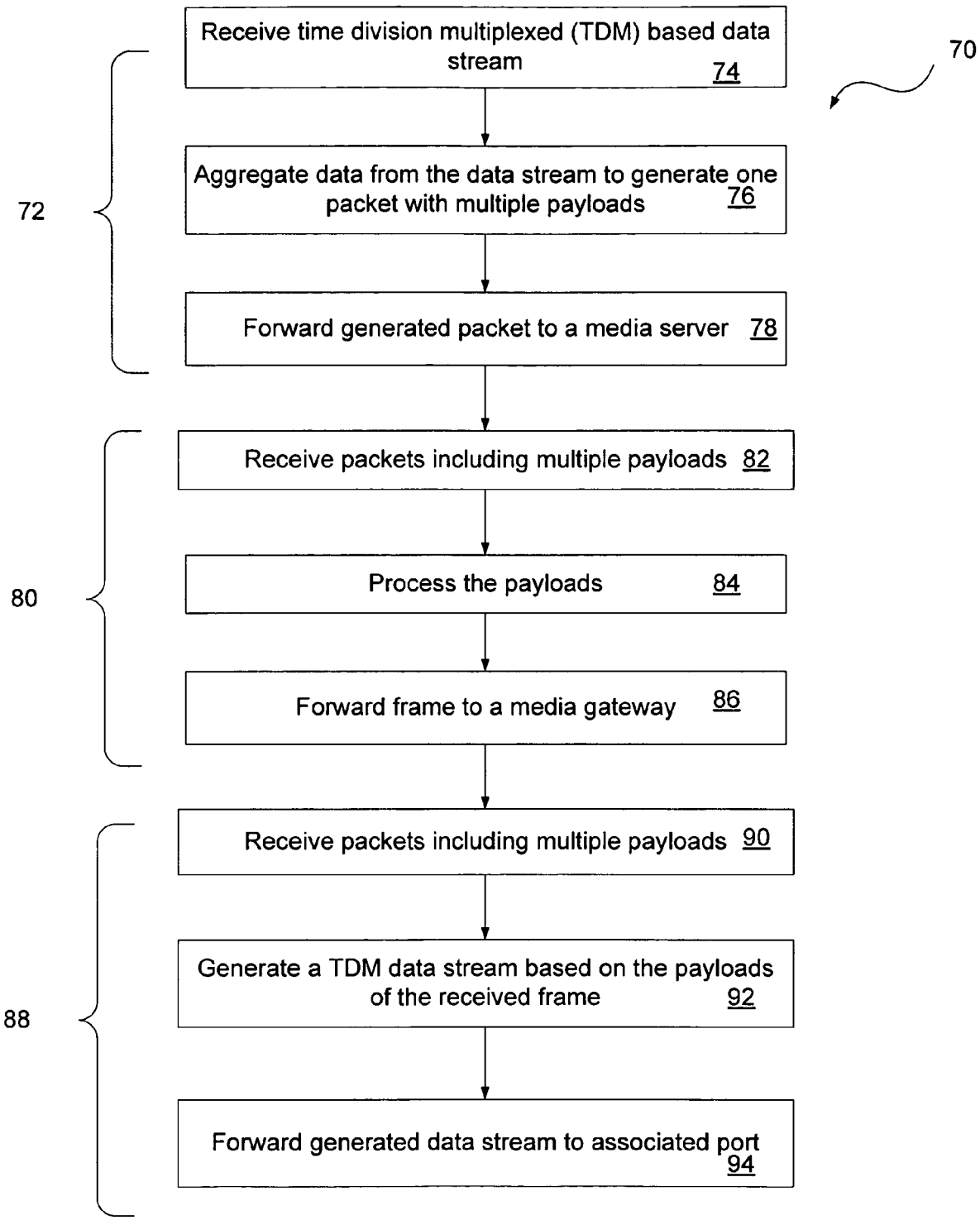
FIG. 3 is a flow chart.

Referring to FIG. 3, a process 70 including the use of superframes for transmission of packets with multiple payloads between a media gateway and a media server is shown. Process 70 includes three processes 72, 80, and 88 that are executed respectively at a sending media gateway, e.g., media gateway 14 (FIG. 1), a media server, e.g., media server 16 (FIG. 1), and a receiving media gateway, e.g. media gateway 17 (FIG. 1). In general, gateways 14 and 17 perform TDM-IP packet conversion to provide an interface between a TDM-based networks 13 and 15 and an IP-based network 11.

Process 72 is executed at a media gateway and includes receiving 74 one or more data streams from multiple senders in a TDM based network. The media gateway 14 aggregates 76 the payloads from the multiple data streams to generate a packet (e.g., a superframe) having multiple payloads and sends 78 the generated packet to a media server 16.

Process 80 is executed at a media server 14 and includes receiving 82 a frame with an aggregated payload from the media gateway. The media server processes 84 the payloads of the received frame and forwards 86 the frame to a media gateway.

Process 88 is executed at a media gateway and includes receiving 90 the frame with the aggregated payload from the media server 16. The media gateway generates 92 multiple TDM based data steams based on the payloads included in the superframe received from the media server 16. The media gateway forwards 94 the data (each data stream having a single payload) to a receiver (e.g., on the TDM based network) associated with the port indicated in the superframe.

While the description above includes generation of superframes for transmission between a media gateway and a media server, a similar frame structure and payload aggregation could be used for transmission of frames between two media gateways (e.g., without an intermediate media server). In addition, a similar frame structure and payload aggregation could be used between two devices where packets received at a first device are forwarded to the second device regardless of location of the frame origination or the destination of the frame.

Other embodiments are within the scope of the following claims.

What is claimed is:

1. A method comprising:
   receiving at a gateway time division multiplexed data from multiple sender devices or TDM channels, the time division multiplexed data including payloads;
   generating a single generated packet that includes the payloads from the received time division multiplexed data from the multiple sender devices;
   indicating in the generated packet a destination indication associated with at least some of the payloads of the received time division multiplexed data, wherein the generated packet includes an IP header, a UDP header, an RTP header, and a payload comprising alternating sequences of the destination indication and an associated payload of the received time division multiplexed data, the destination indication indicating an associated data channel;
   forwarding the generated packet toward a device on an Internet Protocol (IP) based network, wherein forwarding the generated packet reduced latency in receiving the packet compared to receiving multiple packets collectively comprising the time division multiplexed data; and
   forwarding a tone packet separately from the generated packet.

2. The method of claim 1 wherein the device on an Internet Protocol (IP) based network is a media server.

3. The method of claim 1 wherein the destination indication indicates an associated port.

4. The method of claim 1 wherein the payloads have a fixed length.

5. The method of claim 1 wherein the payloads include voice frames.

6. The method of claim 1 wherein the payloads only include voice frames.

7. The method of claim 1 wherein the payloads include silence indication (SID) frames.

8. The method of claim 1 wherein the payloads only include silence indication (SID) frames.

9. The method of claim 1 further comprising limiting the length of the formed packet based on an IP network protocol.

10. The method of claim 1 wherein the time division multiplexed data is from a plurality of systems.

11. A device configured to:
    receive time division multiplexed data from multiple sender devices or TDM channels on a TDN based network, the time division multiplexed data including payloads;
    generate a single generated packet that includes the payloads from the received time division multiplexed data from the multiple sender devices;
    indicate in the generated packet a destination indication associated with at least some of the payloads of the received time division multiplexed data, wherein the generated packet includes an IP header, a UDP header, an RTP header, and a payload comprising alternating sequences of the destination indication and an associated payload of the received time division multiplexed data, the destination indication indicating an associated data channel;
    forward the generated packet toward a device on an IP based network, wherein forwarding the generated packet reduces latency in receiving the packet compared to receiving multiple packets collectively comprising the time division multiplexed data; and
    forward a tone packet separately from the generated packet.

12. The device of claim 11 wherein the payloads have a fixed length.

13. The device of claim 11 wherein the payloads include voice frames.

14. The device of claim 11 wherein the payloads include silence indication frames.

15. A medium having a computer program product, tangibly embodied therein, comprising instructions operable to cause a processor to:
    receive time division multiplexed data from multiple sender devices or TDM channels on a TDM based network, the time division multiplexed data including payloads;
    generate a single generated packet that includes the payloads from the received time division multiplexed data from the multiple sender devices;
    indicate in the generated packet a destination indication associated with at least some of the payloads of the received time division multiplexed data, wherein the generated packet includes an IP header, a UDP header, an RTP header, and a payload comprising alternating sequences of the destination indication and an associated payload of the received time division multiplexed data, the destination indication indicating an associated data channel;
    forward the generated packet toward a device on an IP based network, wherein forwarding the generated packet reduces latency in receiving the packet compared to receiving multiplexed packets collectively comprising the time division multiplexed data; and
    forward a tone packet separately from the generated packet.

16. The medium of claim 15 further comprising instructions to limit the length of the formed packet based on a network protocol.

17. A system comprising:
    an input;
    a gateway; and
    an output, wherein:
    the input provides a communication path between a TDM based network and the gateway;

the output provides a communication path between the gateway and an IP based network; and the gateway is configured to:
receive time division multiplexed data from the input, the time division multiplexed data including payloads;
generate a single generated packet that includes the payloads from the received time division multiplexed data;
indicate in the generated packet a destination indication associated with at least some of the payloads of the received time division multiplexed data, wherein the generated packet includes an IP header, a UDP header, an RTP header, and a payload comprising alternating sequences of the destination indication and an associated payload of the received time division multiplexed data, the destination indication indicating an associated data channel;
forward the generated packet to a device on an IP based network, wherein forwarding the generated packet reduces latency in receiving the packet compared to receiving multiple packets collectively comprising the time division multiplexed data; and
forward a tone packet separately from the generated packet.

18. A method comprising:
receiving a single packet from a device on an Internet Protocol (IP) based network, the packet including data from multiple sender devices on a TDM based network, wherein the received packet includes a destination indication associated with at least some of the data from the multiple sender devices on the TDM based network, wherein the received packet includes an IP header, a UDP header, on RTP header, and a payload comprising alternating sequences of the destination indication and an associated portion of the data from the multiple sender devices on the TDM based network, the destination indication indicating an associated data channel, wherein receiving the received packet reduces latency compared to separately receiving multiple packets collectively comprising the data from the multiple sender devices on the TDM based network;
receiving a tone packet separately from the received packet;
generating a generated packet that includes a payload comprising a portion of the payload from the received packets; and
forwarding the generated packet to a device on a TDM based network.

19. The method of claim 18 wherein the payload includes at least one of voice frames and silence indication frames.

20. A media gateway configured to:
receive a single packet from a device on an Internet Protocol (IP) based network, the packet including data from multiple sender devices on a TDM based network, wherein the received packet includes a destination indication associated with at least some of the data from the multiple sender devices on the TDM based network, wherein the received packet includes an IP header, a UDP header, an RTP header, and a payload comprising alternating sequences of the destination indication and an associated portion of the data from the multiple sender devices on the TDM based network, the destination indication indicating an associated data channel, wherein receiving the received packet reduces latency compared to separately receiving multiple packets collectively comprising the data from the multiple sender devices on the TDM based network;
receive a tone packet separately from the received packet;
generate a generated packet that includes a portion of the payload from the received packet; and
forward the generated packet to a device on a TDM based network.

21. The device of claim 20 wherein the payload includes voice frames.

22. The device of claim 20 wherein the payload includes silence indication frames.

23. A medium having a computer program product, tangibly embodied therein, comprising instructions operable to cause a processor to:
receive a single packet from a device on an Internet Protocol (IP) based network, the packet including data from multiple sender devices on a TDM based network, wherein the received packet includes a destination indication associated with at least some of the data from the multiple sender devices on the TDM based network, wherein the received packet includes on IP header, a UDP header, an RTP header, and a payload comprising alternating sequences of the destination indication and an associated portion of the data from the multiple sender devices on the TDM based network, the destination indication indicating an associated data channel, wherein receiving the received packet reduces latency compared to separately receiving multiple packets collectively comprising the data from the multiple sender devices on the TDM based network;
receive a tone packet separately from the received packet;
generate a generated packet that includes a portion of the payload from the received packet; and
forward the generated packet to a device on the a TDM based network.

* * * * *

UNITED STATES PATENT AND TRADEMARK OFFICE
CERTIFICATE OF CORRECTION

PATENT NO. : 7,403,497 B2 Page 1 of 1
APPLICATION NO. : 10/987450
DATED : July 22, 2008
INVENTOR(S) : Kai Miao It is certified that error appears in the above-identified patent and that said Letters Patent is hereby corrected as shown below:

In Claim 21, column 8, line 23,
replace "device" with -- gateway --

In Claim 22, column 8, line 25,
replace "device" with -- gateway --

Signed and Sealed this

Sixteenth Day of September, 2008

JON W. DUDAS
*Director of the United States Patent and Trademark Office*